(12) United States Patent
Worfolk (10) Patent No.: US 9,721,365 B2
(45) Date of Patent: Aug. 1, 2017

(54) LOW LATENCY MODIFICATION OF DISPLAY FRAMES

(71) Applicant: Synaptics Incorporated, San Jose, CA (US)

(72) Inventor: Patrick Worfolk, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 199 days.

(21) Appl. No.: 14/675,693

(22) Filed: Mar. 31, 2015

(65) Prior Publication Data

US 2016/0162061 A1     Jun. 9, 2016

Related U.S. Application Data

(60) Provisional application No. 62/089,825, filed on Dec. 9, 2014.

(51) Int. Cl.
| | |
|---|---|
| *G06F 3/041* | (2006.01) |
| *G06T 11/20* | (2006.01) |
| *G06F 3/044* | (2006.01) |
| *G06F 3/0488* | (2013.01) |
| *G09G 5/00* | (2006.01) |

(52) U.S. Cl.
CPC .......... *G06T 11/203* (2013.01); *G06F 3/044* (2013.01); *G06F 3/0412* (2013.01); *G06F 3/0416* (2013.01); *G06F 3/04883* (2013.01); *G09G 5/006* (2013.01)

(58) Field of Classification Search
None
See application file for complete search history.

(56) References Cited

U.S. PATENT DOCUMENTS

| | | | |
|---|---|---|---|
| 8,416,197 B2 | 4/2013 | Feng et al. | |
| 8,773,377 B2 | 7/2014 | Zhao et al. | |
| 2008/0055256 A1 | 3/2008 | Kwong et al. | |
| 2010/0277505 A1* | 11/2010 | Ludden | G06F 3/0416 345/634 |
| 2011/0310118 A1 | 12/2011 | Asmi et al. | |
| 2012/0249584 A1 | 10/2012 | Naruse | |
| 2013/0201112 A1* | 8/2013 | Large | G06F 3/04883 345/173 |

(Continued)

FOREIGN PATENT DOCUMENTS

WO    WO-2014145872 A1    9/2014

*Primary Examiner* — Seokyun Moon
*Assistant Examiner* — Peijie Shen
(74) *Attorney, Agent, or Firm* — Patterson + Sheridan, LLP (57) ABSTRACT

This disclosure generally provides an input device that includes a by-pass path for improving latency between a touch controller and a display driver. In one embodiment, the by-pass path directly connects the touch controller and display driver, thereby by-passing a host processor (e.g., a central processing unit (CPU) or graphic processing unit (GPU)) in the input device. By doing so, the input device can detect user input and update a display to reflect the user input faster than if the display driver had to wait until updated display frames are sent from the host processor. For example, the host processor may transmit touch data received from the touch controller to an application that uses the touch data to change the display. In some input devices, this process can take hundreds of milliseconds, which may be enough time for the user to notice a delay.

20 Claims, 5 Drawing Sheets

(56) References Cited

U.S. PATENT DOCUMENTS

2014/0143692 A1     5/2014   Wigdor et al.
2014/0313144 A1*   10/2014   Seto ........................ G06F 3/041
                                                                                                                    345/173

* cited by examiner

LOW LATENCY MODIFICATION OF DISPLAY FRAMES

CROSS REFERENCE TO RELATED APPLICATIONS

This application claims priority to provisional U.S. patent application Ser. No. 62/089,825, filed Dec. 9, 2014. The aforementioned related patent application is herein incorporated by reference in its entirety.

BACKGROUND

Field

Embodiments of the present invention generally relate to electronic devices, and more specifically, to low-latency display updates based on touch events.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein includes a processing system for displaying modified display frame data on a display. The processing system includes a touch controller configured to detect an input object in a sensing region and, in response, transmit touch data to a host processor and to an overlay engine. The overlay engine is configured to receive a first display frame and modify the first display frame with temporary image data based on the received touch data. The processing system includes a display driver configured to prepare the modified display frame data for output to the display.

Another embodiment described herein is a method that includes detecting an input object in a sensing region and transmitting touch data to a host processor and to an overlay engine in response to detecting the input object. The method includes receiving, at the overlay engine, a first display frame and modifying, using the overlay engine, the first display frame with temporary image data based on the touch data. The method includes preparing the modified display frame data for output to a display.

Another embodiment described herein is a processing system that includes a touch controller configured to detect an input object in a sensing region, and in response, transmit touch data to a host processor and to an overlay engine. The overlay engine is configured to receive a display frame from the host processor and update the display frame with a stored action based on the received touch data, wherein, when displayed, the stored action modifies pixel data in the display frame. The processing system includes a display driver configured to prepare the updated display frame data for output to a display.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide an input device that includes a by-pass path for improving latency between a touch controller and a display driver. In one embodiment, the by-pass path couples the touch controller to an overlay engine, thereby by-passing a host processor (e.g., a central processing unit (CPU) or graphic processing unit (GPU)) in the input device. The overlay engine may be included in the display driver. However, in other embodiments, the overlay engine may be elsewhere while still allowing touch data to be transmitted to the overlay engine without first being processed by a host processor responsible for running the host operating system. By doing so, the input device can detect user input and update a display to reflect the user input faster than if the display driver or overlay engine waited until updated display data is sent from the host processor. For example, the host processor may transmit touch data received from the touch controller to an application that uses the touch data to change the display prior to outputting updated display data. Without the by-pass path between the touch controller and overlay engine, the input device must wait for the application to process the touch data, generate graphical data, send the graphical data to the host processor, and then wait for the host processor to send updated frame data to the display driver. In some input devices, this process can take 50-100 milliseconds or more, which may be enough time for the user to notice a delay.

In one embodiment, the display driver includes an overlay engine that receives and processes the touch data received from the touch controller. In other embodiments, the overlay engine may be implemented separate from the display driver. Based on the information in the touch data, the overlay engine determines whether to overlay (or replace, or otherwise modify) pixel data of display frames received from the host processor with pixel data illustrating a predefined action or feature. For example, the touch data may indicate where in a sensing region an input object such as a finger or stylus is located. Based on this location data, the overlay engine may overlay pixel RGB color data on display data received from the host processor. Overlaying pixel data may comprise replacing one or more pixels of the display data received from the host processor and/or modifying one or more pixels of the display data received from the host processor. In one example, the overlay engine outputs a trace that tracks the movement of the input device in the sensing region. Because of latency, the host processor may be unable to track the input object such that the trace is at or near the current location of the input device in the sensing region. However, by using the by-pass path, the overlay engine does not need to rely on the processing system to send updated display information that includes the trace. Instead, the overlay engine overlays a low-latency trace on the current display frame received from the host processor, the low-latency trace better tracking the movement of the input device. After the overlay engine modifies the display data received from the host processor, the overlay engine may output the modified display data to the display driver for output.

In one embodiment, the host processor activates and deactivates the overlay engine and provides characteristics of the predefined feature or action. For example, when performing a tracing function, the host processor may send to the overlay engine the width or color of the trace to be outputted onto the display, as well as potentially an instruction to enable or disable low-latency tracing. These characteristics may vary depending on a user selection. For instance, the user may select in a graphics application whether the user would like to draw with a trace that simulates a paint brush, pencil, pen, and the like. Each of these different traces may have different widths, colors, diffusion rates that simulate the manner in which ink or paint spreads on paper or canvas, and the like. By providing these characteristics to the overlay engine, it can customize the overlaid low latency trace pixels to match, or substantially match, the trace data within the display frame data received from the host processor. When the user no longer wishes to use the trace function, the host processor may deactivate the overlay engine. In other embodiments, the overlay engine may recognize that overlaying a low latency trace is no longer appropriate since no trace is being drawn by the host processor.

Figure 1:
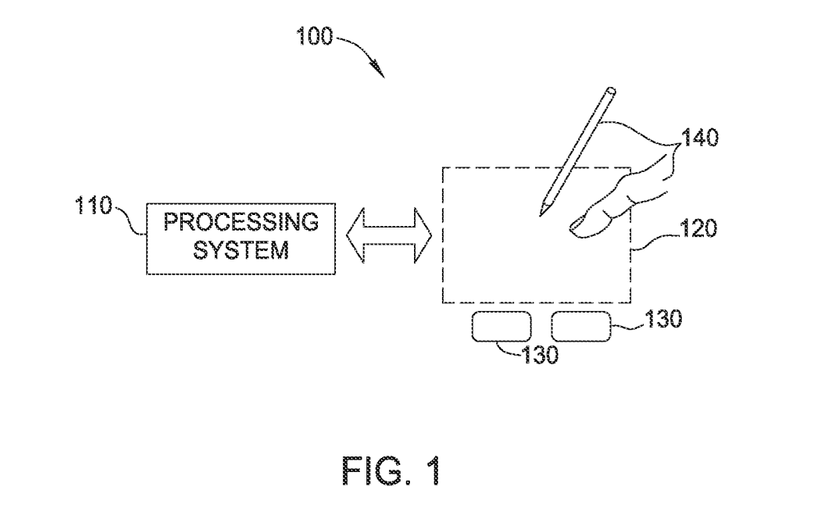
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
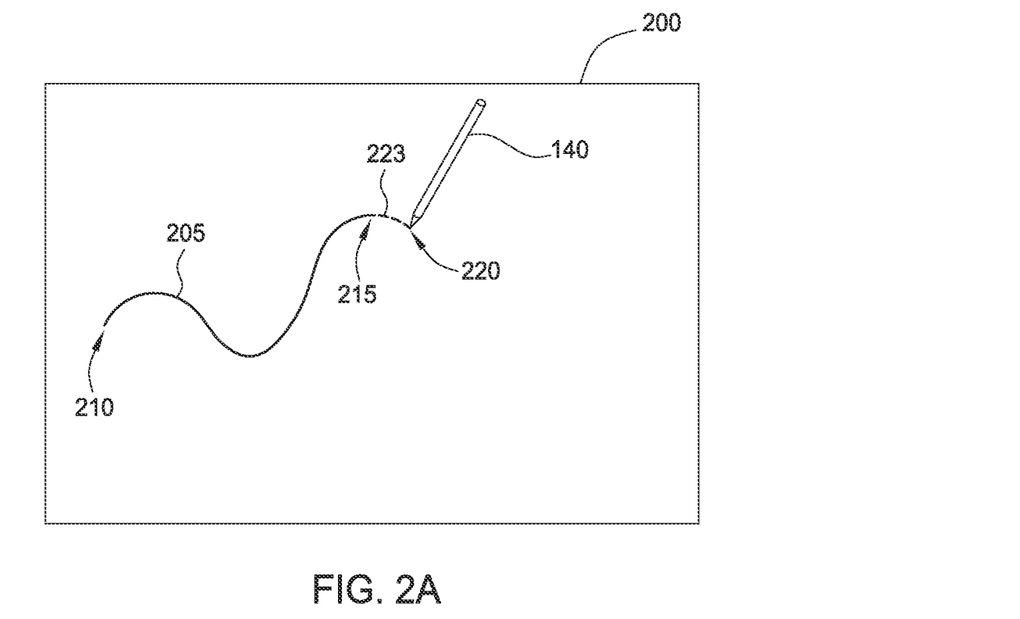
FIG. 2A illustrates displaying a trace in a high-latency system in accordance with an embodiment of the invention.

FIG. 2A illustrates displaying a trace 205 in a high-latency input device in accordance with an embodiment of the invention. Specifically, FIG. 2A illustrates a display screen 200 that includes a sensing region which includes the screen 200. Using an input object 140 (shown here as a stylus), the user can indicate where on the display screen 200 to illustrate the trace 205 which includes a beginning point 210 and an end point 215.

At the period of time shown by FIG. 2A, the input object 140 contacts (or hovers over) the display screen 200 at point 220. It is assumed that the input object 140 has moved between the end of the trace 205 shown by point 215 and its current location on the display screen 200 as shown by point 220. However, because of latency, the trace 205 ends at point 215. As such, the display screen 200 does not display the most recent path traveled by the input object 140 which is shown by the dotted line 223. As mentioned above, the display driver waits to receive updated display frame data from the host processor that reflects the movements of the input object 140 in the sensing region.

To calculate the updated frame data, however, the display driver may have to wait for touch data (which indicates the current position of the input object 140 relative to the display screen 200) to be received and processed by a host processor and one or more applications. Once the application determines updated graphical data that corresponds to the current location of the input object 140, this data is forwarded to the host processor (e.g., a graphic processor) that generates a display frame to be displayed on the screen 200. In order to be displayed on the screen, the generated display frame is transmitted to a display driver. However, this process may take 50 or more milliseconds to complete which means the user may notice that the end of the trace 205 (i.e., point 215) does not correspond to the current location of the input object 140 (i.e., point 220). Further, this problem is magnified as the rate at which the user moves the input object 140 increases. That is, the separation distance between the end of the trace 205 and the current location of the input object 140 increases as the user moves the input object 140 faster across the screen 200. That is, the length of the input object path 223 may increase as the input object 140 is moved faster. Stated differently, the input device latency may become more visible to the user as the movement speed of the input object 140 increases.

Figure 2B:
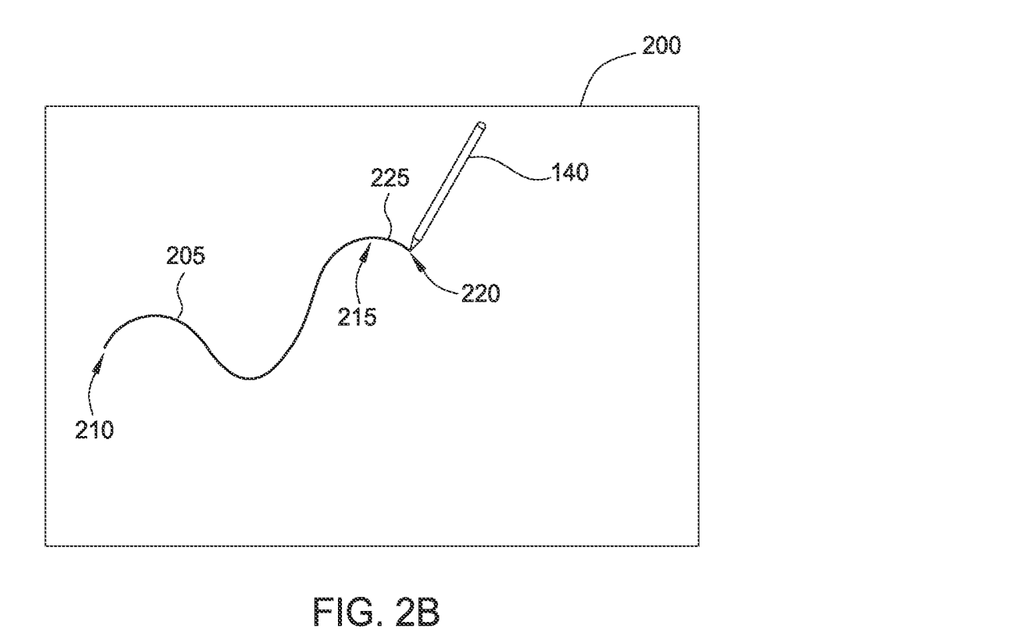
FIG. 2B illustrates displaying the trace in a low-latency system in accordance with an embodiment of the invention.

FIG. 2B illustrates displaying the trace in a low-latency input device in accordance with an embodiment of the invention. To improve the latency relative to the input device illustrated in FIG. 2A, in FIG. 2B, an overlay engine is activated which permits a display driver to respond to updated touch data with reduced latency. Stated differently, FIGS. 2A and 2B may represent the same input device where the overlay engine is deactivated (in the case of FIG. 2A) and when the overlay engine is activated (in the case of FIG. 2B). Although the details of the input device will discussed more thoroughly in regards to FIGS. 4 and 5, generally, the latency of the input device may be improved by forwarding the touch data directly to the overlay engine using a by-pass path rather than sending the touch data only to the host processor.

In FIG. 2B, a temporary trace 225 is appended onto the trace 205. That is, instead of trace 205 ending at point 215, the screen 200 displays a continuous trace that includes both trace 205 and temporary trace 225 which is at or near the contact point 220 of the input object 140. In one embodiment, the trace 205 is displayed using pixel data stored in the display frames received from the host processor, while temporary trace 225 is displayed using the overlay engine which overlays (or replaces) the pixel data in the display frame with updated pixel data to display temporary trace 225. Stated differently, the display driver changes the pixel data in the most recently received display frame to include the updated pixel data generated by the overlay engine for displaying the temporary trace 225. By using the overlay engine, the latency may be reduced significantly (e.g., to less than 20 milliseconds, dependent on display refresh rate) so that, from the perspective of the user, the end of temporary trace 225 corresponds to the location of the input object 140 in the screen 200. That is, the user may be unable to tell that there is any separation distance between the current location of the input object 140 and the end of temporary trace 225. While latency may be decreased with the overlay engine, there is still some amount of latency that may introduce a gap between the temporary trace 225 and the current input object location 220. Additionally, either intentionally or unintentionally, there may be some visible difference in the appearance of the temporary trace 225 and trace 205. For example, the temporary trace 225 may have, perhaps slightly, different characteristics including color and width.

As the user continues to move the input object 140, the overlay engine may continue to extend trace 225 based on updated touch data. Moreover, the overlay engine may use a predefined time window to determine how long to display the temporary trace 225. In one embodiment, the time window for which to continue displaying the temporary trace 225 is as long as or longer than the latency required for the host processor to send an updated data frame (e.g., 100 milliseconds) so that the traces 205, 225 connect in the display screen 200. The length of trace 225 varies depending on the speed at which the user moves the input object 140. As the time window expires for portions of the temporary trace 225, the display driver stops using pixel data from the overlay engine and instead uses the pixel data in display frames received from the host processor to extend trace 205 closer to the real-time position of the input object 140. That is, as the oldest, in the example of FIG. 2B, leftmost, point of temporary trace 225 is no longer displayed, the new display frames extend the rightmost end point of trace 205 such that the traces still form a continuous trace. In other words, a plurality of display frames may be modified with temporary pixels, each of the pixels modifying received display frames for a period of time. After the time period has elapsed for a given temporary pixel, the temporary pixel is no longer displayed since it is expected that the display frame will have a corresponding pixel with up to date information at that time.

In some embodiments, the display driver may analyze the display frame data received from the host processor and output the temporary trace 225 only when the display frame data from the host processor does not include trace 205. In some embodiments, the period of time for which a given portion of a temporary image is added to received display frames is fixed. In some cases the period of time is calculated based on the time it takes a host processor to generate display frame data based on touch data after processing by the operating system and/or applications. In other embodiments, the period of time for which trace 225 is displayed may be dynamic. For example, the overlay engine may analyze whether display frames received from the host processor have started to include a similar image indicating that the temporary image is redundant. Thus, the overlay engine may determine when to cease displaying temporary image data without use of a timer. Additionally, in some cases, this dynamic evaluation of when to cease displaying temporary image data may be combined with a timer that limits the amount of time that the overlay engine may display temporary image data even if no other condition to cease displaying the data has been met.

In one embodiment, the characteristics of trace 225 may substantially match the characteristics of trace 205. For instance, the traces 205, 225 may have similar widths, color, and the like, to generate the appearance of a single continuous trace. Alternatively, the traces 205, 225 may have one or more different characteristics. For instance, the overlay engine may generate pixel data that illustrates trace 225 as being a "wet" trace, while the pixel data in the display frames received from the host processor illustrate the trace 205 as a "dry" trace. The wet trace 225 may mean the overlay engine causes the trace 225 to diffuse on the screen 200 as a function of time. This diffusion may simulate the diffusion of ink or paint when applied to paper or a canvas. As an example, a portion of trace 225 near the current location of the input object 140 may have a smaller width than a portion of trace 225 near the end point 215 of trace 205. When viewed by the user, the trace 225 appears to diffuse or expand in the display screen 200 until the trace 205 replaces a portion of the temporary trace 225 and the ink or paint has "dried"—i.e., the trace no longer diffuses. Of course, the diffusion may depend on the particular action being simulated. For example, if the traces 205, 225 are visual representations of a paint brush, then diffusion may be used. However, if the traces 205, 225 represent a pencil mark, then diffusion may not be used.

Although FIG. 2B illustrates using an input device where touch data by-passes the host processor in order to display traces, this disclosure is not limited to such and may be used to improve responsiveness to other types of features or actions. In one embodiment, the input device is used to improve responsiveness to a user pressing a key of a virtual keyboard displayed on the display screen 200. When the input device displays the virtual keyboard, the host processor activates the overlay engine which begins processing touch data to generate its own pixel data. The overlay engine may store a mapping of the sensing region to the display virtual keyboard. Thus, by evaluating the touch data, the overlay engine may determine whether a particular button in the keyboard was activated by the user. If so, the overlay engine generates pixel data which illustrates the button being pressed by the user. That is, the pixel data generated by the overlay engine replaces the pixel data in the received display frame for the region containing the activated button. Without the overlay engine being activated, the user would press the region and would not see the corresponding action as soon because of the latency described above. As such, the user may reduce her typing speed to ensure that the input has been accepted correctly. However, with the overlay engine active, the user would see (with reduced latency) the prescribed action, and thus, know more quickly which action was detected by the input device. In one embodiment, the overlay engine may inform the host processor that the overlay engine performed the visual animation of the button being pressed so that host processor does not send display frames that then repeat the animation. In another embodiment, the host processor instructs the overlay engine, or the overlay engine instructs the host processor, that the overlay engine is enabled for keyboard use, and the host processor does not generate corresponding keyboard use animations while the overlay engine is enabled for that function. Further, in some embodiments, the overlay engine may analyze display frame data from the host processor and modify the display frame data in order to not display visual animations that would be redundant based on what the overlay engine has already overlaid on previous display frames.

Figure 3A:
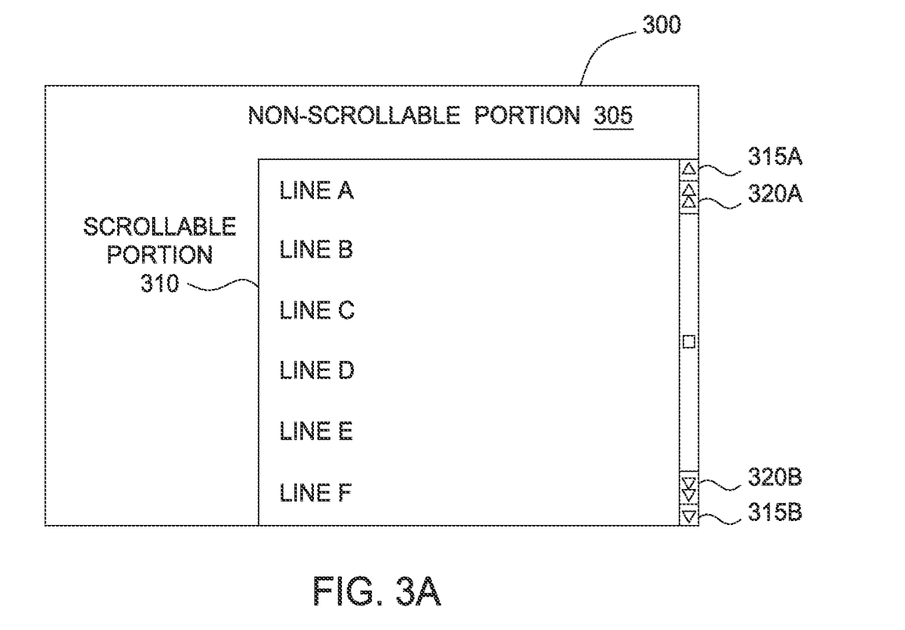
FIGS. 3A and 3B illustrate scrolling a document in a low-latency input device in accordance with an embodiment of the invention.
Figure 3B:
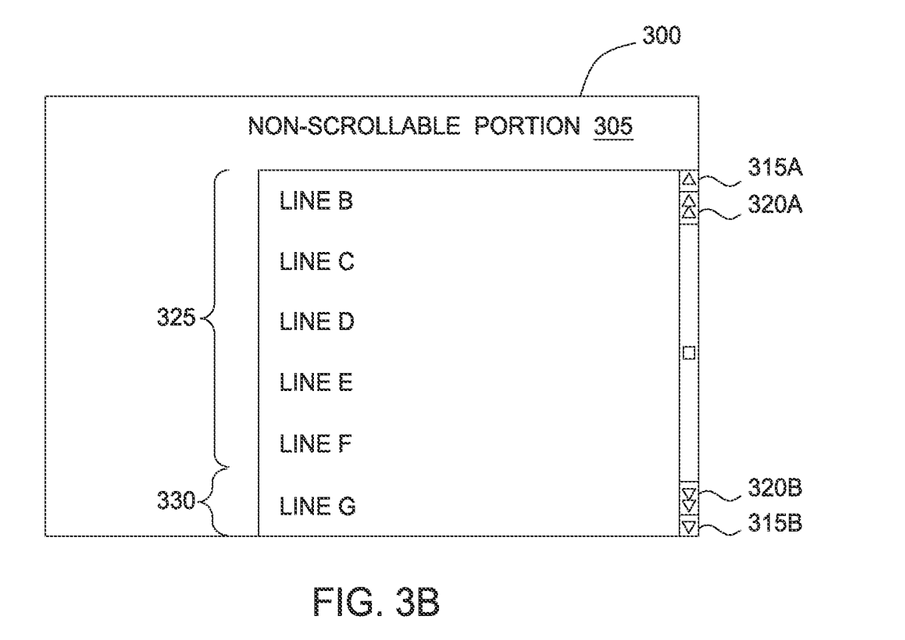

In another embodiment, the input device is used to improve responsiveness to a user scrolling a display document on the display screen 200. FIGS. 3A and 3B illustrate scrolling a document in a low-latency input device in accordance with an embodiment of the invention. As shown in FIG. 3A, a display screen 300 illustrates non-scrollable portion 305 and a scrollable portion 310 which displays a text document. Although a text document is shown, in other embodiments, the scrollable portion 310 may include a webpage, image, video, etc. In some embodiments, the entirety of screen 300 may comprise a scrollable portion.

In response to a scrollable document being displayed on the screen 300, the host processor activates the overlay engine. In one example, a portion of the document currently not being shown within the scrollable portion 310 of the display screen 300 may be cached in the overlay engine. For example, if the displayed document is a text document, the host processor may send to the overlay engine a portion of the document that is above, and a portion of the document that is below, the portion of the document currently being viewed in the display screen 300. Similarly, if an additional portion of the document can be viewed by scrolling horizontally, portions of the document that are to the left and the right of the displayed scrollable portion 310 may be cached in the overlay engine. These cached portions of the document may be just a few lines of the document or an entire page of the document, depending on the type of scrolling. For example, display screen 300 includes scroll button 315 which may be used to scroll one line each time the user taps the button 315. In contrast, scroll buttons 320 may cause the text document to scroll multiple lines each time these buttons 320 are pressed. Furthermore, instead of determining that a button was touched, a touch controller may identify that the user has made a predefined gesture (e.g., a finger swipe or drag) indicating that the document within portion 310 should be scrolled.

In response to touch data indicating the user has tapped one of the scroll buttons 315, 320 or performed a scroll gesture, the overlay engine determines how far to scroll the document. For example, the user may have requested the document scroll up one line by tapping button 315A or that the document scroll up half a page by tapping button 320A. Unlike the previous embodiments where the overlay engine may only overlay (or change) a portion of the display frame currently being displayed, here, the overlay engine may need to change most if not all of scrollable portion 310 of the display screen 200. For example, even scrolling one line means the rest of the document in the scrollable portion 310 is shifted either up or down, thereby altering the entire portion of the display frame responsible for displaying the document on the screen 300.

As shown in FIG. 3B, the overlay engine replaces the display pixels of the display frame in the scrollable portion 310 to reflect that the user has activated button 315A. In response, the overlay engine appends to the bottom of the text document the cached portion of the document (shown here as Line G) and then shifts up the remaining portion 325 of the text document (Lines B-F). Moreover, the overlay engine removes from the scrollable portion 310 the parts of the text document no longer viewable in the display screen 200—i.e., Line A. In this manner, the overlay engine can respond to a user request to scroll a document without waiting for updated display frames from the host processor. In some embodiments, after appropriately indicating that the scrolling engine has occurred, the overlay engine may receive an additional non-viewable portion of the scrollable portion from the host processor. For example, if the overlay engine scrolls down, additional document information for the region below the visible scrollable portion may be necessary in order to populate the cache and enable future low latency scrolls. Additionally, after scrolling down, the cache may contain more document information than is needed for the region above the visible portion of the scrollable portion, and some information in the cache may be discarded.

In one embodiment, the overlay engine continues to display the modified version of the scrollable portion 310 until the host processor sends a new display frame that is updated to reflect that the user pressed button 315A. For example, the overlay engine may use a predetermined window of time that is the same as, or greater than, the latency required for the host processor to provide the updated display frames. Of course, this latency may depend on the particular configuration of the system as well as the applications that need to process the data. Thus, in one embodiment, the window of time is set to account for the maximum possible latency that may occur in the input device.

Figure 4:
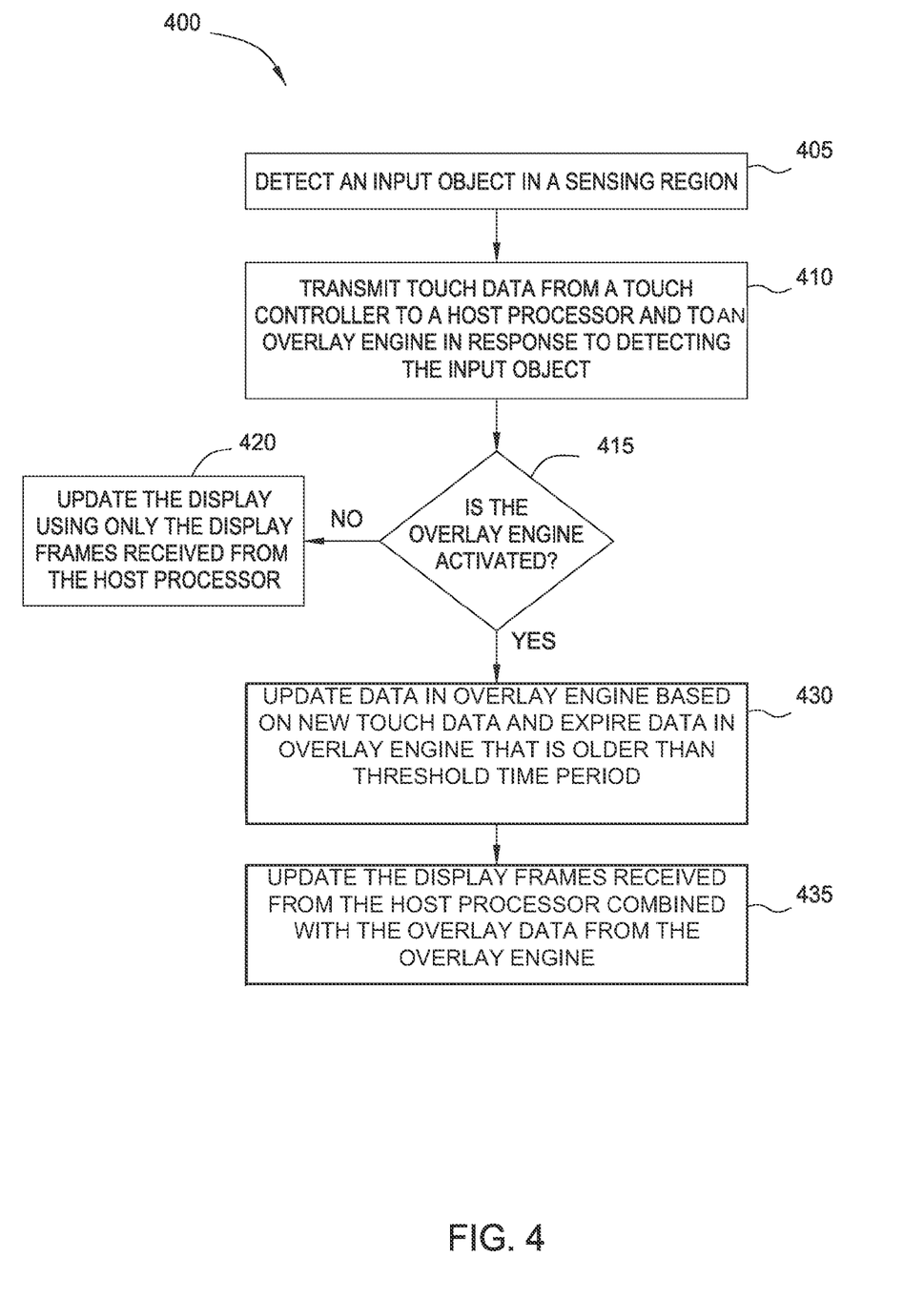
FIG. 4 is a method for displaying temporary trace data that overlays pixel data received from a host processor in accordance with an embodiment of the invention.

FIG. 4 is a method 400 for displaying temporary trace data that overlays pixel data received from a host processor in accordance with an embodiment of the invention. For clarity, FIG. 4 will be described in context with FIG. 5 which illustrates a block diagram of an input device 100 that includes a by-pass path 515 (e.g., a communication channel) between a touch controller 510 and display driver 550 in accordance with an embodiment of the invention. As previously noted, in some embodiments the overlay engine 560 may be located separately from the display driver 550. For example, the overlay engine may be located in a separate graphics processing unit, a video processor located on the display data path between the CPU and the display, or any other location that allows the overlay engine to receive touch data with reduced latency compared to the latency introduced by a host processor. At block 405, the touch controller 510 in the input device 100 detects the presence of an input object in a sensing region 505. As shown in FIGS. 2A, 2B, 3A, and 3B, the sensing region 505 may be integrated into a display screen such that a location in the sensing region 505 corresponds to a location in the display screen. Moreover, the touch controller 510 may use any of the sensing techniques described in FIG. 1 in order to generate touch data indicating a location of the input object in the sensing region 505.

Figure 5:
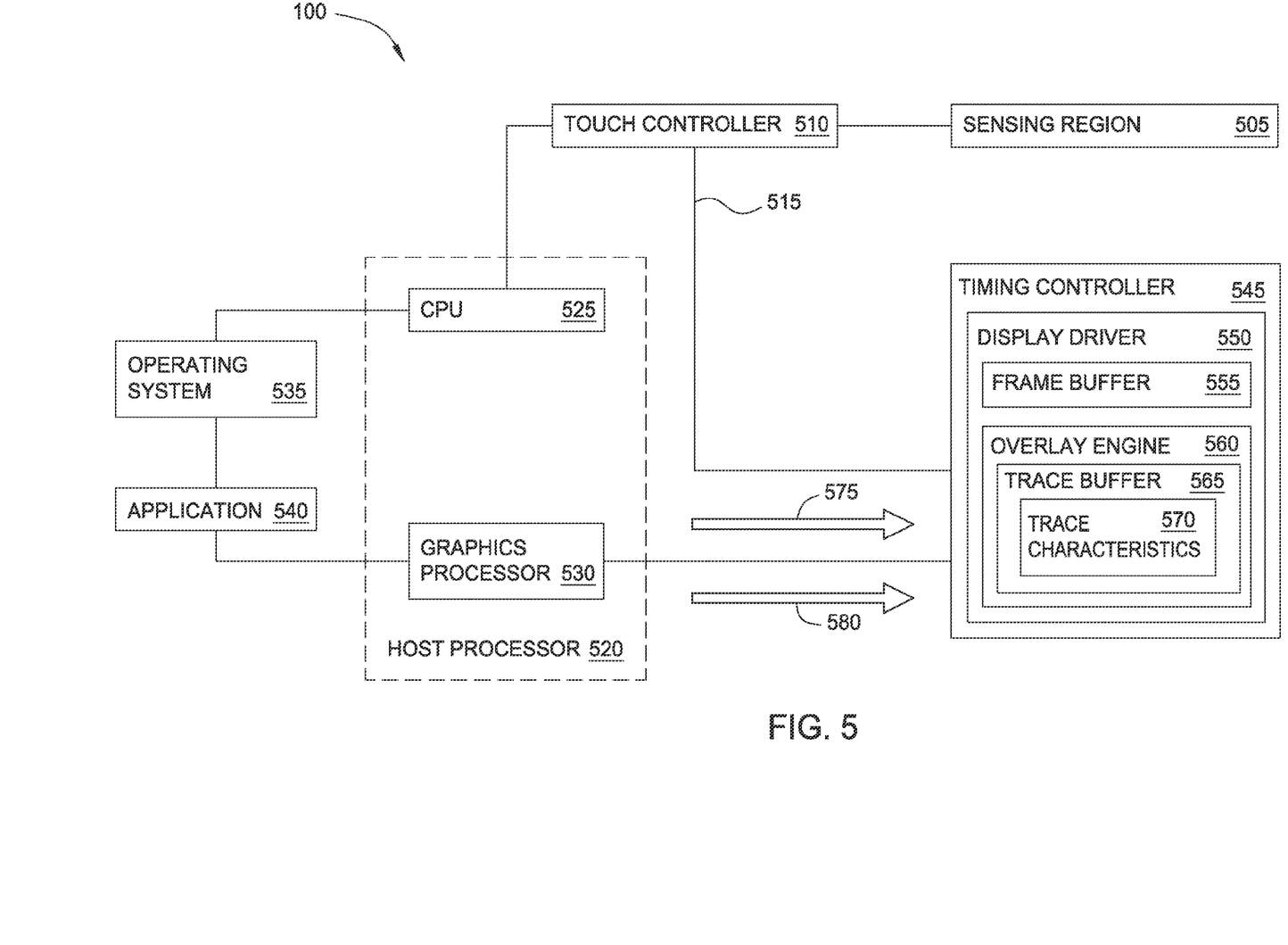
FIG. 5 is a block diagram of an exemplary system that includes a by-pass path between a touch controller and overlay engine in accordance with an embodiment of the invention.

At block 410, in response to detecting the input object, the touch controller 510 transmits touch data to a host processor 520 and to the overlay engine 560. In one embodiment, the touch data transmitted to the host processor 520 and to the overlay engine 560 may contain the same information, but this is not a requirement. For example, touch controller 510 may transmit more or less information to host processor 520 than to overlay engine 560. In addition to including information regarding the location of an input device in the sensing region 505, the touch data may also include a measured force (e.g., pressure) with which the input object contacts the sensing region 505, the type of input object interacting with the sensing region (e.g., different types of stylus), or whether the interaction is a hover or touch. In one example, the touch controller 510 may transmit only the information about the location of the input object in the sensing region 505 and the force of that interaction to the overlay engine 560 but transmit all the captured information to the host processor 520. The overlay engine 560 may perform lower-level processing on the touch data relative to host processor 520, and thus, may not use all the touch data captured by the touch controller 510. Additionally, in some embodiments, touch controller 510 and timing controller 545 may represent modules that are both implemented on a single integrated circuit. Thus, the overlay engine 560 and touch controller may be implanted on a single integrated circuit. Additionally, in some embodiments, the overlay engine may be implemented in an integrated circuit that is in the display data path between the host processor and the timing controller or display driver.

As shown, by-pass path 515 couples the touch controller 510 to the overlay engine 560. In one embodiment, the by-pass path 515 directly couples the touch controller 510 to the overlay engine 560, but this is not a requirement. In any case, the by-pass path 515 permits the overlay engine 560 to receive touch data without having to wait for the host processor 520 to provide display frames that have been updated based on the information contained in the touch data.

In one embodiment, the touch controller 510 and overlay engine 560 are located on separate integrated circuits. In this case, the by-pass path 515 may be a USB, SPI, or I2C communication link. Alternatively, the touch controller 510 and the overlay engine 560 may be formed into the same integrated circuit. Here, the by-pass path 515 may be an internal bus within the integrated circuit to route the touch data between the components. Further, the touch controller 510 may transmit touch data to the overlay engine 560 with the same frequency which with the controller 510 transmits touch data to the host processor 520. Alternatively, the touch controller 510 may transmit the touch data to overlay engine 560 only when instructed to by the host processor 520. For example, if the user is not performing an action enabled by an overlay engine 560 such as tracing, interacting with a virtual keyboard, or scrolling a document, the touch controller 510 may not forward the touch data to the timing controller 545, thereby saving power. However, when enabling the overlay engine 560, the host processor 520 may also instruct the touch controller 510 to begin transmitting the touch data to the timing controller 545.

At block 415, the method 400 determines whether the overlay engine is activated. Stated differently, method 400 depends on whether the input device 100 is currently executing an action performed by the overlay engine 560. For example, when editing a text document, the user may select a button that instructs the input device to perform the traces shown in FIGS. 2A and 2B. In response to this input, the host processor 520 activates the overlay engine 560 to begin processing the touch data received from the touch controller 510 as shown by arrow 575. In other embodiments, the host processor 520 activates the overlay engine 560 when the display screen outputs a scrollable document or displays a virtual keyboard. Conversely, when these features are no longer enabled (e.g., the user no longer wants to draw a trace or a scrollable document is no longer displayed), the host processor 520 may deactivate the overlay engine 560.

If the overlay engine is not activated, at block 420, the input device 100 updates the display using only the frame data sent from the host processor 520. As shown in FIG. 5, the host processor 520 includes a central processing unit (CPU) 525 and a graphics processor 530. These components may either be part of the same processor (e.g., same integrated circuit) or be formed on two different integrated circuits. Further, in some embodiments, the input device 100 may not include the graphics processor 530.

As touch data is received from the touch controller 510, CPU 525 forwards that data to an operating system 535 and application 540 which process the data. The operating system 535 may be any operating system suitable for performing the functions described herein. The application 540 may be a text editor, graphics tool, instant messenger, internet browser, or any other application that uses the functions performed by the overlay engine 560 such as tracing, scrolling, displaying a virtual keyboard, and the like.

Generally, the application 540 uses the touch data to perform one or more functions. For example, when the input object contacts or hovers over a certain displayed button, the application 540 may perform a corresponding action. In this manner, the user can control the functions and operation of the input device 100. In one embodiment, the application 540 processes the touch data to determine how to update the display to reflect the user's interaction with the input device 100. For example, the application 540 may use the touch data to determine that the user is tracing a line or is attempting to scroll a text document. After identifying the user's action and its effect on the image currently being displayed, the application 540 transmits instructions to the graphics processor 530 which generates the pixel data for updating the display. As shown by arrow 580, the graphics processor 530 transmits updated display frames, which contain the pixel data, to the timing controller 545. The display driver 550 uses display frame to update the display screen. However, as described above, this process may take a substantial period time during which the user may notice latency between the time when the user interacts with the sensing region 505 and the display screen is updated to reflect that interaction.

In this example, the graphics processor 530 transmits two different types of data to the timing controller 545: instructions for activating/deactivating the overlay engine (represented by arrow 575) and display frames (represented by arrow 580) which are stored in the frame buffer 555. These different data types may use the same physical connection or use respective connections. Furthermore, the graphics processor 530 may send additional information along with the instructions to activate the overlay engine 560. For example, the graphics processor 530 may provide trace control data that includes trace characteristics 570 (or display characteristics) which are stored in a trace buffer 565. The trace characteristics 570 indicate how the trace should be displayed such as the width of the trace, its color, whether the trace should diffuse to simulate wet ink, and the like. In one embodiment, the trace characteristics 570 may be provided by the application 540. For example, when the user activates a trace function in the application 540, the graphic processor 530 forwards the settings of the trace function to the overlay engine 560 so the engine 560 can display a temporary trace that substantially matches the trace illustrated in the display frames generated by the application 540 and graphics processor 530.

Although not shown, the overlay engine 560 may also store characteristics about other features or actions such as scrolling or displaying the virtual keyboard. For example, the graphics processor 530 may send the portions of a document that are currently not being displayed, or the location of the virtual keyboard in the display and its buttons to the overlay engine 560. In this manner, the overlay engine 560 can use this information along with the touch data received by the touch controller 510 to generate its own pixel data to overlay the received display frames. As previously noted, some embodiments may not include a graphics processor 530. Actions described as being performed by the graphics processor 530 may be performed by other system elements, e.g., CPU 525.

At block 430, the overlay engine 560 updates the display frame currently stored or being received by the overlay engine 560 based on touch data received from the touch controller 510. Because there is additional latency introduced by the host processor processing touch data received from the touch controller, the overlaid pixel data is more recent than the display frames received from the host processor around the same time. In one example, the overlay engine 560 replaces pixel data in a display frame received from the host processor 520 (or in some cases, graphics processor 530) with pixel data generated by the overlay engine 560. As such, the overlay engine 560 updates the pixel data contained in the display frame in the locations where the overlay engine has determined updated pixel data for displaying the temporary trace. This updated data replaces or modifies the pixel data in the display frame at the location of the temporary trace in the display frame.

The overlay engine 560 uses the touch data received on the by-pass path 515 to determine a location of the input object relative to the sensing region 505. This location can then be mapped to a location on the display (which may require coordinate transformation between the sensing region and the display screen). The overlay engine 560 can use the location of the input object in the display screen to determine where to place the temporary trace on the screen. Stated differently, the overlay engine 560 determines which pixels in the display frame are included within the temporary trace and replaces these pixels with the updated pixel data generated by the overlay engine 560. To do so, in one example, the overlay engine 560 maintains a pixel map where each pixel location in the display screen corresponds to a logical one or zero. If a zero, the overlay engine 560 uses the pixel data from the display frame received from host processor 520, but if a one, the overlay engine 560 uses pixel data that it determined.

In one embodiment, before generating the pixel data for the trace, the overlay engine 560 determines whether the touch location is within a specific portion of the display screen. For example, a user interface (UI) for a painting application may currently be displayed in the screen. The user interface may include buttons, menus, and other I/O features to permit the user to customize the application. However, a different portion of the UI may be reserved for the user to actually draw using an input object. The overlay engine 560 may first ensure the user is interacting with this portion of the UI before generating the pixel data for display the trace. If, for example, the user is interacting with the I/O features (e.g., changing the dimensions the characteristics of the trace or activating a drop down menu), the overlay engine 560 would not generate the pixel data since the user is not attempting to draw a trace on the screen. In one embodiment, the location of the portion of the UI in the display screen where the user can draw may be transmitted to the overlay engine 560 by the graphics processor 530.

In one embodiment, the overlay engine 560 may use other types of information besides touch data to display the temporary trace. For example, using path 515, the touch controller 510 may inform the overlay engine 560 of the measured force (e.g., pressure) with which the input object contacts the sensing region 505, the type of input object interacting with the sensing region (e.g., different types of stylus), or whether the interaction is a hover or touch. This supplemental information may affect how the overlay engine 560 displays the temporary trace. For example, the harder the input object presses down on the sensing region 505, the wider the trace generated by the overlay engine 560. In another example, different styli may correspond to different traces—e.g., a stylus that represents a paint brush versus one that represents a pen. By knowing which type is interacting with the sensing region, the overlay engine 560 can output the corresponding traces. In other embodiments, the overlay engine 560 may receive supplemental information from the host processor 520. For example, the graphics processor 530 may forward information from the application 540 which indicates the color or width of the trace. To avoid latency, this information may be received when host processor 520 activates the overlay engine.

A similar process may be used when the overlay engine 560 generates updated pixel data for other actions such as interacting with a virtual keyboard or scrolling a document. For example, the overlay engine may have a buffer that stores the animations that correspond to a button being activated in the keyboard, or a portion of the document that is immediately outside of the current viewable area of the display. Alternatively, the overlay engine may have code that generates the animations that correspond to a button being activated in the keyboard. The overlay engine can use the touch data received on path 515 to determine whether a button on the virtual keyboard was pushed, a scrolling gesture was made, or a scroll button was pushed. With this information, the overlay engine generates updated pixel data that performs the corresponding action such as displaying an animation of a button in the virtual keyboard being pressed or scrolling a document. As above, the display driver 550 can use the pixel data generated by the overlay engine 560 to update pixel data in several received display frames. For example, depending on the action, the display driver 550 uses the pixel data to update a portion of display screen for a time window that can last hundreds of milliseconds—e.g., between five and sixty frames assuming a 60 Hz update rate.

Referring to FIGS. 2B and 5, the portion of the temporary trace 225 closest to the end point 215 has been displayed the longest amount of time while the point 220 closest to the input object 140 has been displayed the shortest amount of time of those points on the temporary trace 225. In one embodiment, the overlay engine 560 maintains different clocks for each pixel (or groups of pixels) that display the temporary trace 225. As these clocks reach the time window, the overlay engine 560 no longer overlays the pixel data in the display frame with the pixel data generated by the overlay engine 560 and instead uses the pixel data from the display frames received from the host processor. As long as the time window is equal to or greater than the latency required for the host processor 520 to generate display frames responsive to touch input, the pixel data in the display frames continue to extend trace 205 such that it touches temporary trace 225. That is, as the clocks for the different pixels forming the temporary trace 225 expire and the end point 215 shifts to the right, the length of trace 205 in the new display frames increases such that the traces 205 and 225 still appear to the user to form one continuous trace. Once the user stops moving the input device, all the pixels forming the temporary trace eventually expire and only the pixel data in display frames is used to generate the trace. Stated differently, the overlay engine 560 stops replacing pixel data in the display frame with pixel data generated by the overlay engine 560.

In some embodiments, the overlay engine 560 ceases to display a temporary trace segment after the time window for that trace segment has expired. The segment may include a single pixel, a plurality of pixels, or any other portion of a temporary trace. In other words, while displaying temporary trace data, the overlay engine 560 may modify or replace corresponding pixels of a display frame from the host processor. In order to revert back to the display frame data received from the host processor for a certain portion of the data, the overlay engine 560 can simply cease modifying that portion of display frame data from the host processor rather than having to make any additional modification.

The display driver 550 is responsible for receiving display frame data from the overlay engine 560, or in some cases the host processor or GPU, and preparing the display frame data for output to a display. The process to prepare the display frame data for output to a display varies according to the format of display frame data received and the format of output expected by a display. In some cases, the display driver outputs display frame data as generated by the host processor, or another component of the system, without any modification or update by the overlay engine 560. In other situations, the display driver 550 receives updated display frame data that has been processed and modified by the overlay engine 560 and prepares the updated display frame data for output to a display.

At block 435, the display driver 550 outputs display frames to a display. If the overlay engine 560 was activated during processing of a display frame, the display driver 550 outputs the updated display frame data. If not, the display driver outputs unmodified display frame data. In some embodiments, the overlay engine 560, or a another component which includes the overlay engine 560, may receive display frame data and transmit unmodified display frame data to the display driver 550 if the overlay engine 560 is not active.

The host processor 520 can deactivate overlay engine 560 by transmitting to the overlay engine 560 an instruction as shown by arrow 575. In another example, the host processor 520 may not send an instruction to overlay engine 560 directly, but instead instruct touch controller 510 to no longer send the touch data to the overlay engine 560 using by-pass path 515. Without the touch data, the overlay engine 560 is unable to generate the temporary trace data on modify the display frame data received from the host processor. In one embodiment, the host processor 520 may deactivate the overlay engine 560 in response to the user no longer selecting the trace feature, closing an application corresponding to the action performed by the overlay engine 560, removing the virtual keyboard from being displayed, or no longer displaying a scrollable document.

In one embodiment, the host processor 520 may receive touch data from the timing controller 545 rather than the touch controller 510. That is, the touch controller 510 forwards the touch data to the timing controller 545 which then forward this data (or some portion thereof) to the host processor 520. In such an example, the data communication path between the touch controller 510 and host processor 520 may be omitted which may simplify the design of the input device 100. Upon receiving the touch data from the timing controller 545, the host processor 520, operating system 535, and application 540 can process the touch data and generate update display frames as discussed above.

In another embodiment, the overlay engine is part of a processor that sits between the application processor and the display. The touch controller transmits touch data directly to this intermediate processor and the intermediate processor will forward the touch data to the application or host processor and also use the touch data in the overlay engine. The intermediate processor can update the pixel data received from the application with the output of the overlay engine and forward the resulting display data to the display timing controller or display driver.

In another embodiment, unlike in FIG. 5 where the touch controller 510 transmits touch data directly to the overlay engine 560 using by-pass path 515, the touch controller 510 transmits the touch data only to host processor 520 which then forwards the touch data to the overlay engine 560 as shown by arrow 580. For example, the host processor 520 may forward the touch data to both the operating system 535 and the overlay engine 560. Thus, while the operating system 535 and application 540 process the touch data, the overlay engine 560 can use the touch data to determine whether to generate updated pixel data to replace a portion of the current display frame. Once the application 540 and graphics processor 530 process the touch data and generate updated display frames, the overlay engine 560 can cease using the temporary traces on portions of the display frame that are up to date in the display frame data received from the host processor. Thus, in this embodiment, the input device 100 may not include the by-pass path 515 and instead rely on the host processor 520 to transmit touch data to both the operating system 535 and the overlay engine 560. Because the overlay engine 560 must wait until touch data is received from the host processor 520 rather than receiving it directly from the touch controller 510, this arrangement may require more time to generate and display the updated pixel data provided by the overlay engine 560 relative to the time when the interaction with the input device is detected than the embodiment shown in FIG. 5, but doing so may simplify the design of the device 100.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

I claim:

1. A processing system for displaying modified display frame data on a display, the processing system comprising:
   a touch controller configured to detect an input object in a sensing region and, in response, transmit touch data to a host processor and to an overlay engine, wherein the overlay engine is configured to:
   receive a first display frame and modify the first display frame with temporary image data based on the received touch data;
   assign respective timers to different pixels of the temporary image data, wherein the respective timers are activated at different times; and
   remove the different pixels from the temporary image data when the respective timers satisfy a predefined time window; and
   a display driver configured to prepare the modified first display frame for output to the display.

2. The processing system of claim 1, wherein the overlay engine receives trace control data from the host processor, wherein the temporary image data comprises an image of a first trace, wherein the trace control data describes characteristic of the first trace.

3. The processing system of claim 2, wherein the trace control data describes a diffusion rate at which a width of the first trace expands over time.

4. The processing system of claim 3, wherein the first trace simulates diffusion of wet ink while a second trace in a second display frame received from the host processor simulates dry ink to replace the different pixels removed from the temporary image data.

5. The processing system of claim 1, further comprising:
a data interface configured to transmit the touch data from the touch controller to the host processor; and
a communication channel configured to transmit the touch data from the touch controller to the overlay engine, wherein the communication channel by-passes the host processor.

6. The processing system of claim 5, wherein the touch data transmitted from the touch controller to the host processor using the data interface is the same as the touch data transmitted from the touch controller to the overlay engine using the communication channel.

7. The processing system of claim 1, wherein the touch controller and overlay engine are one of: (i) integrated onto a common integrated circuit and (ii) integrated onto separate integrated circuits that are communicatively coupled.

8. A method, comprising:
detecting an input object in a sensing region;
transmitting touch data to a host processor and to an overlay engine in response to detecting the input object;
receiving, at the overlay engine, a first display frame;
modifying, using the overlay engine, the first display frame with temporary image data based on the touch data;
assigning respective timers to different pixels of the temporary image data, wherein the respective timers are activated during different times;
removing the different pixels from the temporary image data when the respective timers satisfy a predefined time window; and
preparing the modified first display frame for output to a display.

9. The method of claim 8, further comprising:
receiving at the overlay engine trace control data transmitted by the host processor, wherein the temporary image data comprises an image of a first trace and wherein the trace control data describes characteristics of the first trace.

10. The method of claim 9, wherein the trace control data describes a diffusion rate at which a width of the first trace expands over time.

11. The method of claim 10, wherein the first trace simulates diffusion of wet ink while a second trace in a second display frame received from the host processor simulates dry ink to replace the different pixels removed from the temporary image data.

12. The method of claim 8, wherein transmitting the touch data to the overlay engine comprises:
transmitting the touch data on a communication channel between a touch controller and the overlay engine that by-passes the host processor.

13. The method of claim 12, wherein the touch data transmitted from the touch controller to the host processor is the same as the touch data transmitted from the touch controller to the overlay engine.

14. A processing system, comprising:
a touch controller configured to detect an input object in a sensing region, and in response, transmit touch data to a host processor and to an overlay engine;
the overlay engine configured to:
receive a display frame from the host processor;
update the display frame with a stored action based on the received touch data, wherein, when displayed, the stored action modifies pixel data in the display frame;
assign respective timers to different pixels of the modified pixel data, wherein the respective timers are activated during different times; and
remove the different pixels from the modified pixel data when the respective timers satisfy a predefined time window; and
a display driver configured to prepare the updated display frame for output to a display.

15. The processing system of claim 14, further comprising:
a communication channel coupling the touch controller to the overlay engine, wherein the communication channel by-passes the host processor.

16. The processing system of claim 14, wherein the overlay engine comprises a buffer configured to store the stored action.

17. The processing system of claim 16, wherein the overlay engine is configured to use the buffer to update received display frames based on a control signal received from the host processor, wherein the control signal activates the overlay engine thereby instructing the overlay engine to begin using the stored action to replace the pixel data.

18. The processing system of claim 14, wherein the stored action is one of: drawing a trace, a graphic indicating a displayed button was activated, and scrolling.

19. The processing system of claim 1, wherein the overlay engine is configured to:
receive, from the host processor, location data indicating locations of a plurality of virtual keys of a virtual keyboard currently being outputted on the display; and
determine that a user has pressed one of the plurality of virtual keys by comparing the location data of the plurality of virtual keys to a location in the touch data, wherein the temporary image data is part of a displayed animation indicating the user has pressed one of the plurality of virtual keys.

20. The method of claim 8, further comprising:
receiving, from the host processor, location data indicating locations of a plurality of virtual keys of a virtual keyboard currently being outputted on the display; and
determining that a user has pressed one of the plurality of virtual keys by comparing the location data of the plurality of virtual keys to a location in the touch data, wherein the temporary image data is part of a displayed animation indicating the user has pressed one of the plurality of virtual keys.

* * * * *